(12) United States Patent
Marques

(10) Patent No.: US 10,577,287 B2
(45) Date of Patent: *Mar. 3, 2020

(54) COMPLEX STRUCTURES IN REFRACTORY BODIES AND METHODS OF FORMING

(71) Applicant: Corning Incorporated, Corning, NY (US)

(72) Inventor: Paulo Gaspar Jorge Marques, Le Chatelet en Brie (FR)

(73) Assignee: CORNING INCORPORATED, Corning, NY (US)

( * ) Notice: Subject to any disclaimer, the term of this patent is extended or adjusted under 35 U.S.C. 154(b) by 240 days.

This patent is subject to a terminal disclaimer.

(21) Appl. No.: 15/630,009

(22) Filed: Jun. 22, 2017

(65) Prior Publication Data

US 2018/0010718 A1 Jan. 11, 2018

Related U.S. Application Data

(63) Continuation of application No. 14/361,829, filed as application No. PCT/US2012/067015 on Nov. 29, 2012, now Pat. No. 9,714,729.

(60) Provisional application No. 61/564,917, filed on Nov. 30, 2011.

(51) Int. Cl.
| | |
|---|---|
| *C04B 35/64* | (2006.01) |
| *B01J 19/00* | (2006.01) |
| *B01J 6/00* | (2006.01) |
| *F16L 15/00* | (2006.01) |

(52) U.S. Cl.
CPC ............. *C04B 35/64* (2013.01); *B01J 6/00* (2013.01); *B01J 19/0093* (2013.01); *F16L 15/00* (2013.01); *B01J 2219/00813* (2013.01); *B01J 2219/00824* (2013.01); *B01J 2219/00831* (2013.01); *Y10T 137/8593* (2015.04)

(58) Field of Classification Search
CPC ... C04B 2235/6028; B28B 7/34–7/342; B28B 21/86; B28B 23/0068
USPC .................................. 264/635, 682, DIG. 44
See application file for complete search history.

(56) References Cited

U.S. PATENT DOCUMENTS

| | | |
|---|---|---|
| 3,940,301 A | 2/1976 | Straw et al. |
| 4,554,962 A | 11/1985 | Wright |
| 5,476,211 A | 12/1995 | Khandros |

(Continued)

OTHER PUBLICATIONS

Bauer and Knitter, "Formgebung keramischer Mikrokomponenten" Galvanotechnik, 1999 90(11 ):3122-3130,pp. 1-9.

(Continued)

*Primary Examiner* — Erin Snelting
(74) *Attorney, Agent, or Firm* — Gregory V. Bean

(57) ABSTRACT

A method of forming complex structures in a ceramic-, glass- or glass-ceramic-body microfluidic module is disclosed including the steps of providing at green-state refractory-material structure comprising least a portion of a body of a microfluidic module, providing a removeable insert formed of a carbon or of a carbonaceous material having an external surface comprising a negative surface of a desired surface to be formed in the microfluidic module, machining an opening in the green-state structure, positioning the insert in the opening, firing the green-state structure and the insert together, and after firing is complete, removing the insert. The insert is desirably a screw or screw shape, such that interior threads are formed thereby. The insert desirably comprises graphite, and the structure desirably comprises ceramic, desirably silicon carbide.

8 Claims, 2 Drawing Sheets

(56) References Cited

U.S. PATENT DOCUMENTS

| | | | |
|---|---|---|---|
| 5,601,673 | A | 2/1997 | Alexander |
| 6,065,195 | A | 5/2000 | Chatterjee et al. |
| 6,350,404 | B1 | 2/2002 | Li et al. |
| 7,919,062 | B2 | 4/2011 | Yuen |
| 9,126,202 | B2 | 9/2015 | Lobet et al. |
| 2003/0118757 | A1 | 6/2003 | Bauer et al. |
| 2004/0198598 | A1 | 10/2004 | Kawano et al. |
| 2005/0170142 | A1 | 8/2005 | Remy |
| 2006/0280640 | A1 | 12/2006 | Schlesser et al. |
| 2007/0123410 | A1 | 5/2007 | Morena et al. |
| 2009/0036303 | A1 | 1/2009 | Zhu et al. |
| 2013/0136671 | A1 | 5/2013 | Li et al. |
| 2013/0330246 | A1 | 12/2013 | Stemmet |

OTHER PUBLICATIONS

International Search Report of the International Searching Authority; PCT/US2012/067015; dated Apr. 8, 2013; 5 Pages; European Patent Office.

Safari et al "Fabrication of fine-scale 1-3Pb(Zrx, Ti1-x)O3 Ceramic/polymer composites using a modified lost mold method" SPIE vol. 2721, pp. 251-262.

COMPLEX STRUCTURES IN REFRACTORY BODIES AND METHODS OF FORMING

This application is a continuation of U.S. application Ser. No. 14/361,829 filed on May 30, 2014, which claims the benefit of priority under 35 U.S.C. § 371 of International Application Serial No. PCT/US12/67015, filed on Nov. 29, 2012, which, in turn, claims the benefit of priority of U.S. Provisional Application Ser. No. 61/564,917 filed on Nov. 30, 2011 the content of which are relied upon and incorporated herein by reference in their entireties as if fully set forth below.

FIELD

The present disclosure relates generally to methods for forming complex structures in refractory body microfluidic modules and to the modules thus formed, more specifically, to methods for forming attachment system structures, such as screw threads, within a ceramic body microfluidic device in order to secure a connector, typically a metallic connector for fluidic interconnection.

BACKGROUND AND SUMMARY

Microreactors, or continuous flow reactors having channels micrometer—up to tens of millimeter-scale minimum dimensions, offer many advantages over conventional batch reactors, including very significant improvements in energy efficiency, reaction condition control, safety, reliability, productivity, scalability, and portability. In such a microreactor, the chemical reactions take place continuously, generally in confinement within such channels.

To avoid safety problems in strongly exothermic reactions, it is proposed in the art to perform these reactions in a microreactor. In microreactors, these reactions are easier to control than in conventional batch reactors. In addition, it is possible in the microreactor to realize reaction conditions which are not realizable for safety reasons in a classical method in the laboratory or on the industrial scale. Robustness and chemical resistance of the microreactor body are therefore essentials when very corrosive compounds are employed (ie mineral acids or caustic solutions). Glass and ceramic materials (for example, Pyrex® glass, Aluminum oxide or Silicon Carbide), or glass-ceramics, are generally preferred for these conditions.

For glass, ceramic, or glass-ceramic microreactor, fluidic interconnection fittings are generally attached to microreactor fluidic module body through a seal compression system which employs a polymer o-ring tightened against an o-ring sealing location on the module body. The role of the o-ring is to ensure tightness but also to accommodate for stresses (such as small amounts of tube flexion or expansion mismatch on heating) which can lead to the failure of the refractory material of the fluidic module. Other techniques like brazing or welding can be applied, but these require very close matching of the coefficients of thermal expansion of the materials involved.

One type of seal in current use employs an o-ring against flat portion of the microreactor body, forming an o-ring face seal, such as shown and described for example, in FIG. 1 of EP1854543, a patent assigned to the present assignee. While the o-ring face seal shown in EP1854543 performs well enough under some conditions, there is a risk of the o-ring being extruded through the small remaining clearance between the o-ring seat and the fluidic module face. Another disadvantage is the need for external structures encircling the fluidic module or reaching around the edges thereof in order to compress the o-ring against the module face. Such structures can increase the complexity and cost, and the footprint of a reactor which typically includes a plurality of fluidic modules.

One alternative fitting system is known in the art as "o-ring boss seal". FIG. 1 (prior art) shows a cross-section of an instance a fluidic interconnection system 10 employing an o-ring boss seal. A "boss" is cylindrical projection 22 on a structure 20, typically a cast or forged metal structure. The end 24 of the projection 22 is machined or otherwise formed to provide a flat, smooth surface 26 for sealing. Internal threads 28 are provided inside the bore of a fluidic port or opening 30 in the structure 20. A coupler 40 includes external threads 42 to mate with the internal threads 28, a flat annular sealing surface 44 to mate with smooth surface 26, and a gripping or engaging surface 46 for threading the coupler 40 into the structure 20. When the coupler 40 and the structure 20 are assembled together, an o-ring 50 is trapped in the annular space closed off by the contact of surface 26 and surface 44. Pressure from within the opening 30 merely wedges the o-ring more tightly between the coupler and a tapered inner surface 23 of the projection 22. A tube 60 is inserted within a compressible sleeve 48, which is compressed against the tube 60 by a compression nut 49 to retain the tube 60.

A fitting system 10 like that of FIG. 1 is preferable to the o-ring face seal system described above and in EP1854543 in at least two respects: (1) a pipe-thread style attachment is used, so no external fixtures are necessary for attachment of the fixture and compression of the o-ring 50, and (2) the o-ring 50, when in use, is seated into an enclosed cavity and cannot escape even at high pressure differentials. For at least these reasons, it would be desirable to employ with a refractory fluidic modules a fitting system similar to the fitting system 10 in FIG. 1, having an o-ring boss seal.

The main difficulty in employing a system similar to the fitting system 10 in refractory materials like glass, ceramic and glass-ceramic is that special tools and machinery are necessary to machine features without breaking the materials. In general, grinding machines with diamond-faced tools are required, and the glass or the ceramic part must be cooled with water to avoid excessive heat. In the case of very hard ceramics, such as SiC (silicon carbide), WC (tungsten carbide) or $B_4C$ (boron carbide), such a process is very expensive because the process very slow and the special and expensive tooling is quickly worn down. As a consequence, the typical and preferred method to form these very hard materials is green-state machining—machining the ceramic in a green, unfired state. Unfortunately, the dimensional change on firing is too great for molding threads for fittings, since the shrinkage variation is about 1-3%. Green-state machining to rough tolerances followed by post-firing machining to final tolerance is possible, but still very expensive.

The present disclosure provides a method for forming complex structures in refractory body-based microfluidic modules, in particular, for forming screw threads within a ceramic body or within a portion or component of a ceramic body of a microfluidic device for mechanical fastening, particularly in order to secure a coupler for fluidic interconnection.

According to one embodiment of the disclosure, a method of forming complex structures in a ceramic-, glass- or glass-ceramic-body microfluidic module is provided, including the steps of providing at green-state refractory-material structure comprising least a portion of a body of a microfluidic module, providing a removeable insert formed of a carbon or of a carbonaceous material having an external surface comprising a negative surface of a desired surface to be formed in the microfluidic module, machining an opening in the green-state structure, positioning the insert in the opening, firing the green-state structure and the insert together, and after firing is complete, removing the insert. The insert is desirably a screw or screw shape, such that interior threads are formed thereby. The insert desirably comprises graphite, and the structure desirably comprises ceramic, desirably silicon carbide.

Certain variations and embodiments of the method of the present disclosure are described in the text below and with reference to the figures, described in brief immediately below.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Creating complex or fine structures in engineering ceramics is costly. Even when the majority of the work is carried out in the green state, there is still a need for diamond machining to remove the majority of the surface defects and imperfections that could act as critical flaws in service. Further, when the structures to be formed are standard screw threads, the geometry and dimensional tolerances of typical metallic machine screw threads are very tight (100 micrometers or less). Sintered ceramic structures often undergo shrinkage of as high as 15-20% during firing of the structure. Therefore, it is very difficult to form threads with required tolerances out of a sintered ceramic product without requiring significant post-machining. For these reasons engineers today commonly employ clamping and bolting arrangements for mechanical joining of glass or ceramic with other solid parts.

Figure 1:
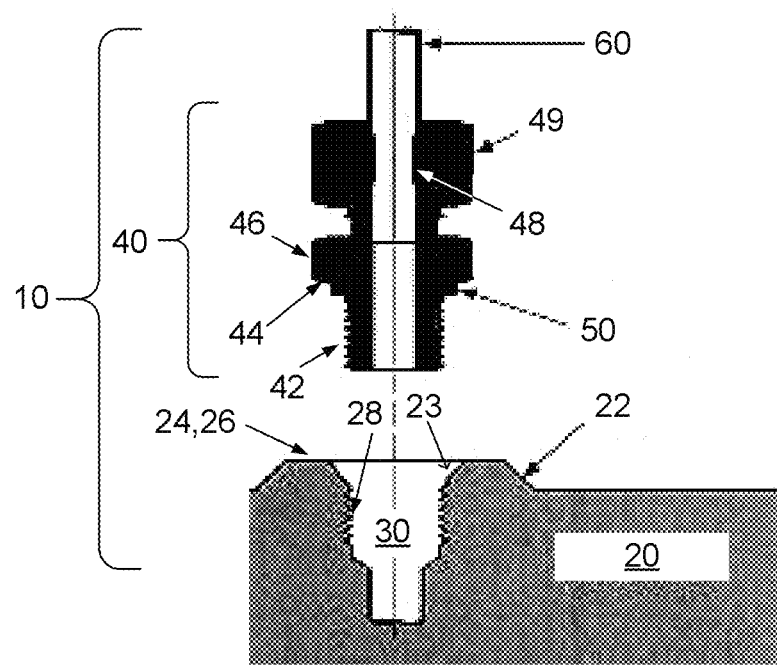
FIG. 1 (prior art) is an elevational cross-section of a fluidic interconnection fitting system employing an o-ring boss seal.

The present disclosure provides a manufacturing process which allows the simple screwing of a metallic threaded fluidic coupler, such as the (prior art) coupler described above and shown in FIG. 1, directly into the body of a ceramic microreactor. Other complex structures may also be formed by the present method, the basic steps of which are diagrammed in the process flow diagram of FIG. 2.

Figure 2:
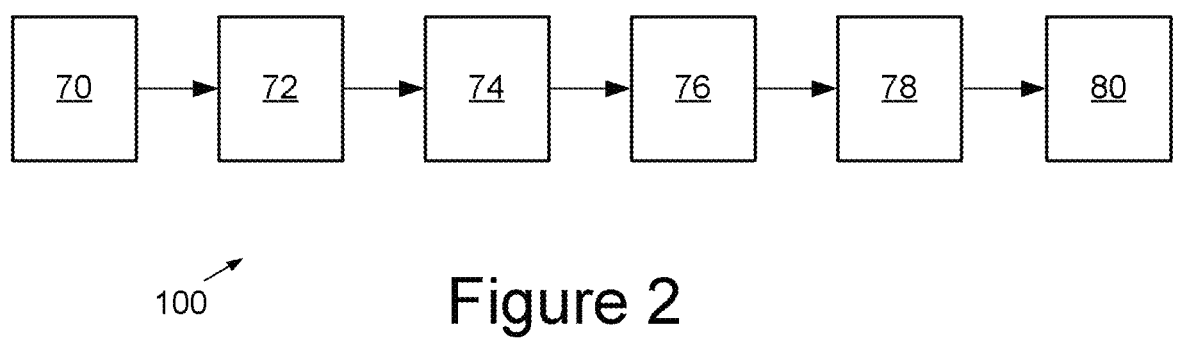
FIG. 2 is a flow diagram of an embodiment of steps in the method of the present disclosure.

The method 100 as represented in FIG. 2 includes a step 70 of providing a green-state refractory-material structure comprising least a portion of a body of a microfluidic module. The refractory-material is selected from glass, ceramic, glass-ceramic and mixtures or combinations of these, including filled sinterable materials wherein glass, ceramic, glass-ceramic and mixtures or combinations of these comprise the sinterable components of the material.

The method 100 further comprises a step 72 of providing a removeable insert formed of carbon or of a carbonaceous material. The external surface of the insert comprises a negative surface of a desired surface to be formed in the ceramic-body microfluidic module. The negative surface may be formed by machining from a carbon block, for example.

The method 100 further comprises a step 74 of machining an opening in the green-state structure and positioning the insert in the opening. The opening is preferably made so as to give just-sufficient clearance for easily positioning the insert in the opening, such as 100 micrometer clearance, for example, although it may be larger or smaller if needed. It is desirable that the open volume between the negative surface of the insert and the interior surface of the opening, or the portion thereof to be formed, is sufficiently small, and the shrinkage of the green-state structure, on firing and conversion to post-fired state, is sufficiently large, such that the open volume is closed curing the firing process, such that the interior surface of the opening, or portion thereof to be formed, conforms to the surface of the insert.

The method 100 further comprises step 76, of positioning the insert in the opening, step 78, firing the green-state structure and the insert together, and step 80, after consolidation of the structure, removing the insert. If the insert is not a relatively dense carbon material, the insert may be removed by oxidation. Nevertheless, the insert must be sufficiently durable during the firing process such that it retains its shape through sufficient consolidation of the structure for formation of the desired positive surface on the interior surface of the opening. If the insert is comprised of a relatively dense carbon material, the insert may be removed by mechanical means (simply being unscrewed, in the case of a screw-form insert) or by oxidizing the insert, such as by high temperature oxidation in air or oxygen, or by other known techniques.

Figure 3:
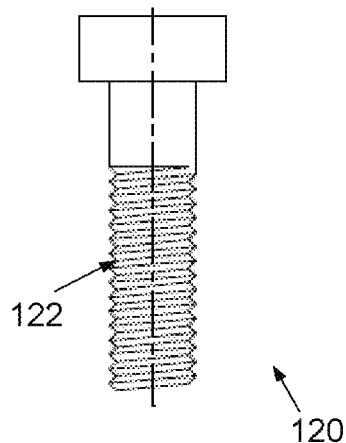
FIG. 3 is an elevational view of a temporary insert according to an embodiment of the present disclosure in the form of a screw.
Figure 4:
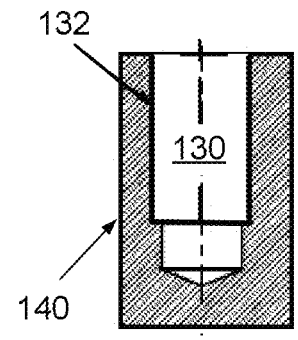
FIG. 4 is a cross-sectional view of a portion of a green-state refractory body having an opening machined therein to receive the temporary insert.
Figure 5:
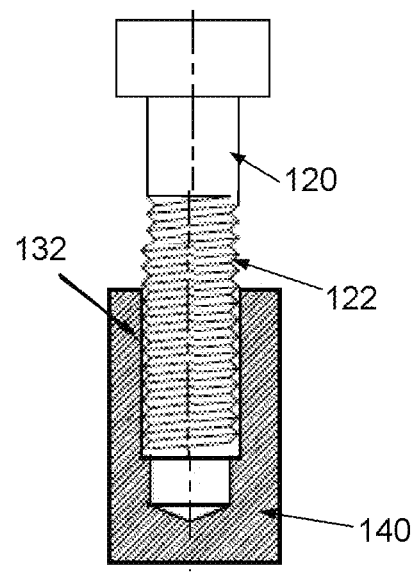
FIG. 5 is a cross-sectional view of the portion of a green-state refractory body of FIG. 4 with the temporary insert of FIG. 3 positioned within the opening therein.
Figure 6:
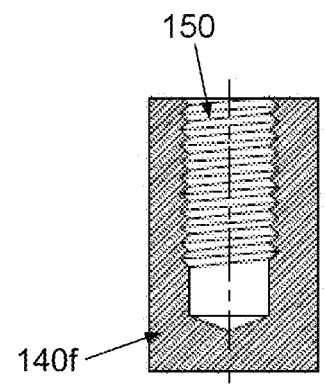
FIG. 6 is a cross-sectional view of the green-state refractory body of FIGS. 4 and 5, but now in a post-fired state after firing of the green-state body and removal of the temporary insert, showing the presence of complex structures, in the form of internal threads, formed by the firing of the green-state refractory body with the temporary insert positioned within the opening.

The principle application envisioned for this method is shown in part in FIGS. 3-6. A graphite screw 120, as shown in FIG. 3, may be employed as a mirror image insert with a negative surface 122 (the screw threads). To use the graphite screw 120 in the present method, an opening 130 is formed, such as by machining (drilling) in a green-state structure 140. In this embodiment, the opening 130 includes a wider portion 132 to receive the insert in the form of the graphite screw 120. FIG. 5 shows the opening 130 with the insert in the form of a graphite screw 120 positioned therein. The outer diameter of the screw threads 122 is almost the same as the inner diameter of the wider portion 132 of the opening 130, with desirably about 100 micrometers clearance. Firing then causes the green-state structure 140 to shrink, and, after removal of the screw 120, interior threads 150 remain, formed on the inner surface of the opening 130 of the fired structure 140f, as shown in FIG. 6. The thread features can be molded at any sides of the planar components (top, bottom and even the edge) of a microfluidic module, provided that the size and/or thickness of the plate is big enough to embed the graphite screw.

The thermal expansion of the graphite material should be close enough to the ceramic or the glass in order to prevent excessive residual stress during cooling of the parts. The insert material should also be chosen carefully to prevent undesired chemical reactions between the screw and the ceramic or the glass body. Any reactions can change the nature of the material locally, and produce inferior properties. Graphite is an example material which is desirable with glass and Silicides (eg, SiC, Si3N4, MoSi2). Graphite material also has the advantage of being a very elastic material (Young's modulus of about 10 MPa) and thus limits stresses. Different variations of graphite material also offer a large range of thermal expansion coefficients (from 5 t $80 \times 10^{-7}$/° C.) and graphite withstands very high temperature when in an inert atmosphere. Graphite grade 2020 available from Mersen can work with SiC and Si3N4 ceramics or with low expansion Borosilicate glasses (such as Pyrex® glass).

The present method is of particular interest for use with silicon carbide ceramic since its properties are very attractive for microreactor application and the post-machining of such a hard ceramic is unaffordable. A green part of SiC can be obtained by cold pressing and the opening 130 can be machined simply with conventional cutting tool. The graphite screw is then be seated into a the opening. Afterwards, the green-state body is fired at 2100° C. in a non-oxidizing atmosphere to prevent formation of oxides of silicon in preference silicon carbide, and to prevent burning of the graphite insert. After densification, the structure is desirably be cooled, such as to room temperature, then finally oxidized in air at 1000° C. to remove the graphite insert.

The methods disclosed herein and the devices produced thereby are generally useful in performing any process that involves mixing, separation, extraction, crystallization, precipitation, or otherwise processing fluids or mixtures of fluids, including multiphase mixtures of fluids—and including fluids or mixtures of fluids including multiphase mixtures of fluids that also contain solids—within a microstructure. The processing may include a physical process, a chemical reaction defined as a process that results in the interconversion of organic, inorganic, or both organic and inorganic species, a biochemical process, or any other form of processing. The following non-limiting list of reactions may be performed with the disclosed methods and/or devices: oxidation; reduction; substitution; elimination; addition; ligand exchange; metal exchange; and ion exchange. More specifically, reactions of any of the following non-limiting list may be performed with the disclosed methods and/or devices: polymerisation; alkylation; dealkylation; nitration; peroxidation; sulfoxidation; epoxidation; ammoxidation; hydrogenation; dehydrogenation; organometallic reactions; precious metal chemistry/homogeneous catalyst reactions; carbonylation; thiocarbonylation; alkoxylation; halogenation; dehydrohalogenation; dehalogenation; hydroformylation; carboxylation; decarboxylation; amination; arylation; peptide coupling; aldol condensation; cyclocondensation; dehydrocyclization; esterification; amidation; heterocyclic synthesis; dehydration; alcoholysis; hydrolysis; ammonolysis; etherification; enzymatic synthesis; ketalization; saponification; isomerisation; quaternization; formylation; phase transfer reactions; silylations; nitrile synthesis; phosphorylation; ozonolysis; azide chemistry; metathesis; hydrosilylation; coupling reactions; and enzymatic reactions.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

Having described the subject matter of the present disclosure in detail and by reference to specific embodiments thereof, it will be apparent that modifications and variations are possible without departing from the scope of the invention defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A method of forming complex structures in a ceramic-, glass- or glass-ceramic-body, the method comprising the steps of:
    providing a green-state refractory-material structure;
    providing a removeable insert formed of a carbon or of a carbonaceous material, an external surface of the insert comprising a negative surface of a desired surface to be formed;
    machining an opening in the green-state structure, the opening being of sufficient size to leave an open volume between the external surface of the insert and an interior surface of the opening when the insert is positioned in the opening;
    positioning the insert in the opening;
    firing the green-state structure and the insert together;
    during firing, reducing or closing the open volume; and
    after firing is complete, removing the insert.

2. The method according to claim 1 wherein an open volume between the negative surface of the insert and an inside surface of the opening is sufficiently small, and wherein a shrinkage of the green-state structure upon firing is sufficiently large, such that the open volume is closed during the firing process and such that said surface of the opening conforms to the negative surface of the insert.

3. The method according to claim 1 wherein firing comprises firing in an inert atmosphere.

4. The method according to claim 1, wherein removing comprises oxidation of the insert.

5. The method according to claim 1, wherein the insert is a screw and wherein the complex structure comprises interior screw threads.

6. The method according to claim 1, wherein the step of providing a green-state structure comprises providing a structure comprising one or more of glass, glass-ceramic and ceramic.

7. The method according to claim 1, wherein the step of providing a green-state structure comprises providing a structure comprising a ceramic.

8. The method according to claim 1, wherein the step of providing a green-state structure comprises providing a structure comprising silicon carbide.

* * * * *